(12) United States Patent
Schwegman

(10) Patent No.: US 7,954,510 B2
(45) Date of Patent: *Jun. 7, 2011

(54) PUMP VALVE RETAINER

(75) Inventor: Steven L. Schwegman, Spring, TX (US)

(73) Assignee: FMC Technologies, Inc., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/657,780

(22) Filed: Jan. 25, 2010

(65) Prior Publication Data

US 2010/0135833 A1  Jun. 3, 2010

Related U.S. Application Data

(63) Continuation of application No. 11/473,291, filed on Jun. 21, 2006, now Pat. No. 7,681,589.

(51) Int. Cl.
*F16K 15/06* (2006.01)
*F04B 53/10* (2006.01)

(52) U.S. Cl. ........... 137/543.13; 137/15.17; 137/315.33; 137/543.23; 417/454; 417/455

(58) Field of Classification Search ............... 137/15.17, 137/15.18, 15.19, 315.33, 542, 543.13, 543.23; 417/454, 455

See application file for complete search history.

(56) References Cited

U.S. PATENT DOCUMENTS

| 785,912 | A | * | 3/1905 | Park | 417/452 |
| 3,645,297 | A | * | 2/1972 | Boultinghouse | 137/637.3 |
| 3,937,249 | A | * | 2/1976 | Suey | 137/543.13 |
| 6,623,259 | B1 | * | 9/2003 | Blume | 417/559 |

* cited by examiner

*Primary Examiner* — Stephen M Hepperle
*Assistant Examiner* — William McCalister
(74) *Attorney, Agent, or Firm* — Henry C. Query, Jr.

(57) ABSTRACT

A retainer for movably securing a valve member within a fluid bore of a pump comprises a retainer head which includes at least one peripheral groove and a retainer hub which is connected to or formed integrally with the retainer head. The valve member is movably coupled to the retainer hub, and the retainer head is movable to position the groove over a radial protrusion in the fluid bore. In this position, the retainer is secured to the pump and the valve member is accordingly movably secured within the fluid bore.

8 Claims, 4 Drawing Sheets

PUMP VALVE RETAINER

This application is a continuation of U.S. patent application Ser. No. 11/473,291, which was filed on Jun. 21, 2006.

BACKGROUND OF THE INVENTION

The present invention relates to reciprocating plunger and piston-type pumps which are used, for example, in oilfield operations. In particular, the invention is related to an improved valve retainer for supporting a suction valve within the suction bore of the pump.

Plunger pumps for the oilfield industry generally include a plunger which is positioned in a plunger bore, a suction valve which is positioned in a suction bore and a discharge valve which is positioned in a discharge bore. In operation, the plunger is reciprocated in the plunger bore to alternately draw fluid into the pump through the suction valve and then force the fluid out of the pump through the discharge valve.

Prior art plunger pumps typically include a valve retainer for supporting and guiding the suction valve within the suction bore. Without this valve retainer, the suction valve and its corresponding parts would be free to rise into the path of the plunger and thereby damage the plunger or other parts of the pump. In some pumps the suction valve and the retainer comprise a single assembly. In other pumps, especially larger pumps, the valve retainer is installed separately from the suction valve.

In these later types of pumps, various means are used to mount the valve retainer within the plunger bore or the suction bore. One example of a prior art valve retainer is the "longhorn" style valve retainer. These valve retainers comprise a hub within which the stem of the suction valve is slidably received and two diametrically opposed "horns" which are rotated into corresponding grooves formed in the suction bore to thereby secure the hub in place. However, these grooves create stress concentrations within the suction bore which can reduce the serviceable life of the pump.

SUMMARY OF THE INVENTION

In accordance with the present invention, these and other limitations in the prior art are overcome by providing a novel valve retainer for movably securing a valve member within the fluid bore of a pump. The retainer comprises a retainer head which includes at least one peripheral groove and a retainer hub which is connected to or formed integrally with the retainer head. The valve member is movably coupled to the retainer hub, and the retainer head is movable to position the groove over a radial protrusion in the fluid bore. In this position, the retainer is secured to the pump and the valve member is accordingly movably secured within the fluid bore.

In one embodiment of the invention, the retainer head comprises two peripheral grooves, each of which is positionable over a corresponding radial protrusion in the fluid bore. In addition, these grooves may be located approximately diametrically opposite each other on the retainer head.

In accordance with one aspect of the invention, the retainer hub slidably engages the valve member. In particular, the retainer hub may comprise a cylindrical bore within which a stem portion of the valve member is slidably received.

In accordance with another aspect of the invention, the groove defines a peripheral lip which is located between the protrusion and the valve member. In addition, although not necessary for purposes of the present invention, the circumferential length of the lip may be equal to or greater than the circumferential length of the protrusion. Moreover, the retainer may comprise a cover for the lip, which is comprised of, for example, an elastomeric material, in order to prevent metal-to-metal contact between the lip and the protrusion.

In accordance with yet another aspect of the invention, the retainer includes means for preventing the retainer from rotating relative to the fluid bore when the groove is positioned over the protrusion. For example, this rotation prevention means may comprise a retainer spring which includes a first end which is secured to the retainer and a second end which extends into the groove. Accordingly, when the groove is positioned over the protrusion, the second end will enter a notch which is formed in the protrusion and thereby prevent the retainer from rotating relative to the fluid bore.

Thus, the present invention provides an effective mechanism for retaining the valve member within the fluid bore. Since the retainer is designed to engage a radial protrusion in the fluid bore, rather than a recess or a slot, the fluid bore is not subject to undue stress concentrations. Therefore, the pump is less likely to fail during operation. Moreover, since the retainer comprises a lip which covers the protrusion, the protrusion will not be likely to erode during extended use of the pump.

These and other objects and advantages of the present invention will be made apparent from the following detailed description, with reference to the accompanying drawings. In the drawings, the same reference numbers are used to denote similar components in the various embodiments.

DETAILED DESCRIPTION OF THE INVENTION

Figure 1:
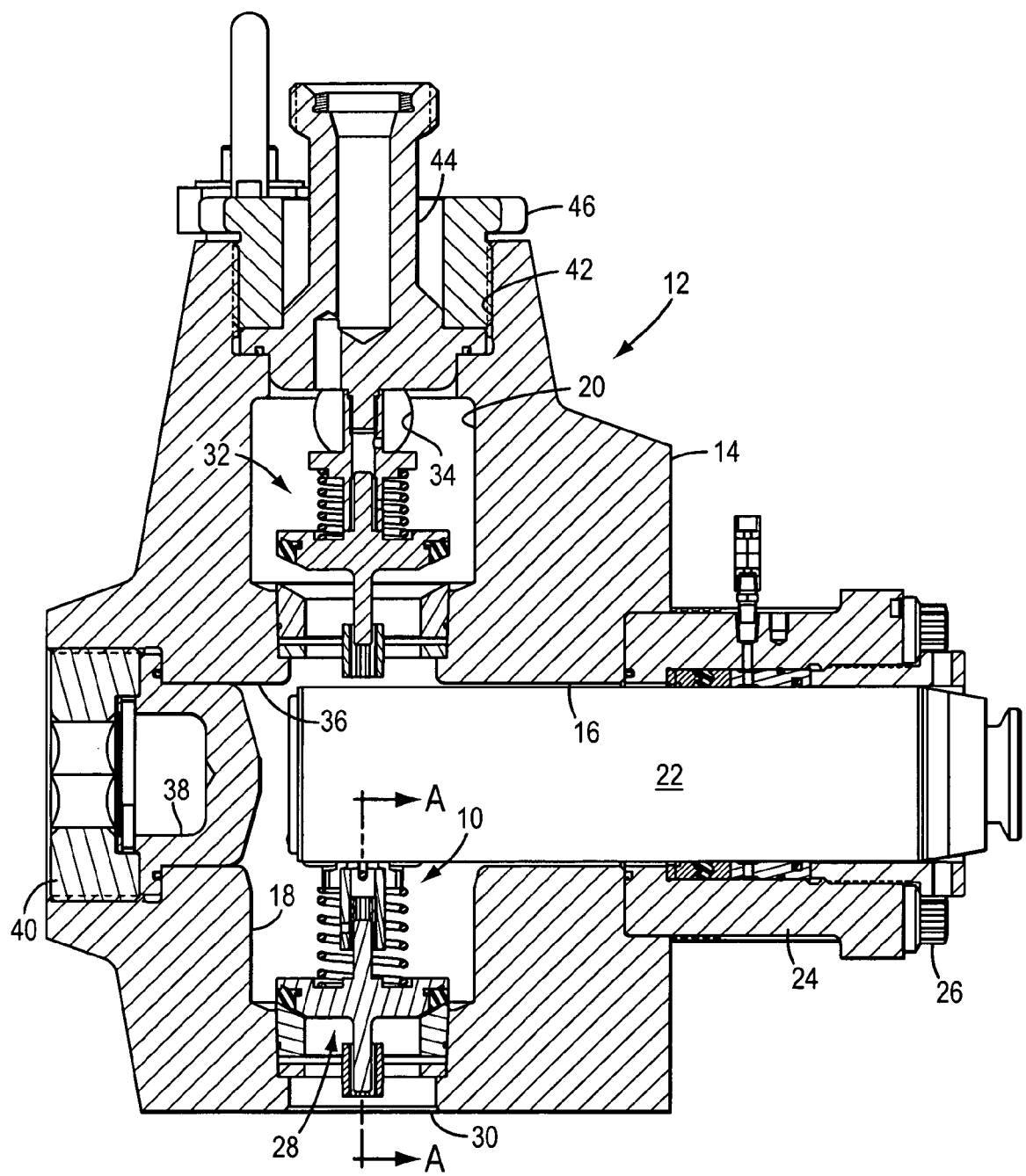
FIG. 1 is a cross sectional view of the fluid end of an illustrative plunger pump which incorporates the valve retainer of the present invention.

Referring to FIG. 1, the valve retainer of the present invention, which is indicated generally by reference number 10, is shown incorporated into the fluid end 12 of an exemplary plunger pump. The fluid end 12 includes a housing 14 through which a plunger bore 16, a suction bore 18 and a discharge bore 20 each extend. A plunger 22 is positioned in the plunger bore 16 and is sealed thereto by a conventional stuffing box 24 which is secured to the housing 14 by, for example, a number of cap screws 26. A suction valve 28 is positioned in the suction bore 18 between the plunger bore 16 and a pump inlet 30, and a discharge valve 32 is positioned in the discharge bore 20 between the plunger bore and a pump outlet 34. During assembly and servicing of the fluid end 12, access to the suction bore 18 may be attained through a first port 36 which is sealed by a cover 38 that is secured to the housing 14 by a first retainer nut 40, and access to the discharge bore 20 may be attained through a second port 42 which is sealed by a cover 44 that is secured to the housing by a second retainer nut 46.

Figure 2:
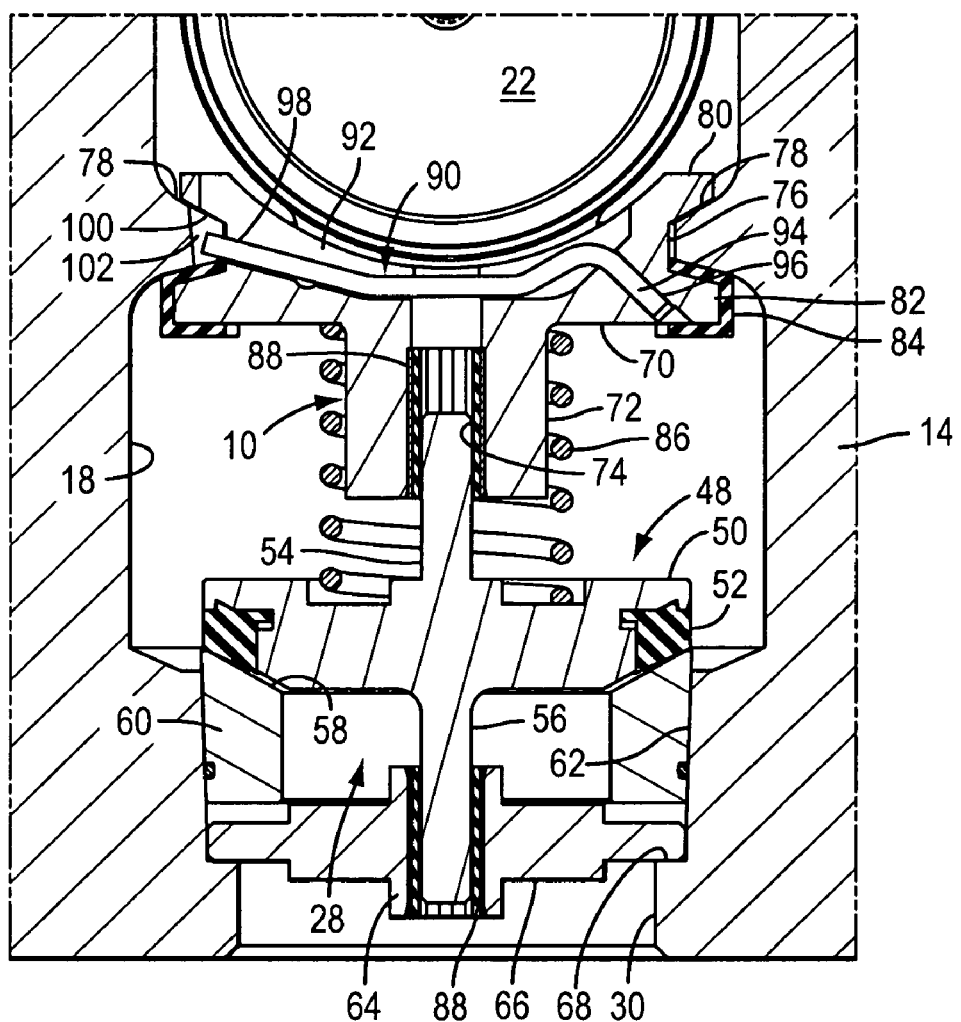
FIG. 2 is an enlarged, partial cross section view of the plunger pump fluid end taken along line A-A in FIG. 1.

Referring now to FIG. 2, the suction valve 28 is shown to comprise a valve member 48 which, in accordance with the present invention, is retained within the suction bore 18 by the valve retainer 10. The valve member 48 includes a generally disc-shaped body 50, an annular seal ring 52 which is disposed in a corresponding groove that is formed in the body, an upper valve stem 54 which extends transversely from an upper end of the body, and a lower valve stem 56 which extends transversely from a lower end of the body. The seal ring 52 is designed to engage a corresponding valve seat 58 which is formed on an upper end of a cylindrical seat member 60 that is secured such as by press fitting in a reduced diameter portion 62 of the suction bore 18. The lower valve stem 56 is slidably received in a lower guide bushing 64 which is connected to a perforated guide disc 66 that in turn is retained between the seat member 60 and a shoulder 68 which is formed between the pump inlet 30 and the reduced diameter portion 62 of the suction bore 18.

Figure 3:
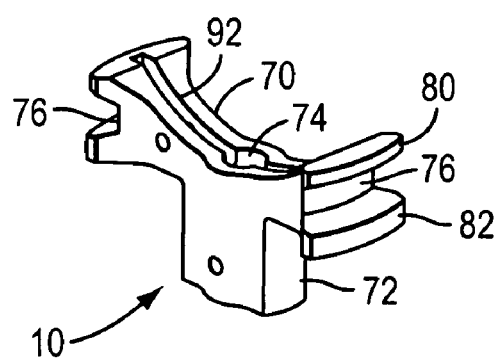
FIG. 3 is a perspective view of the retainer head portion of the valve retainer of the present invention.
Figure 5:
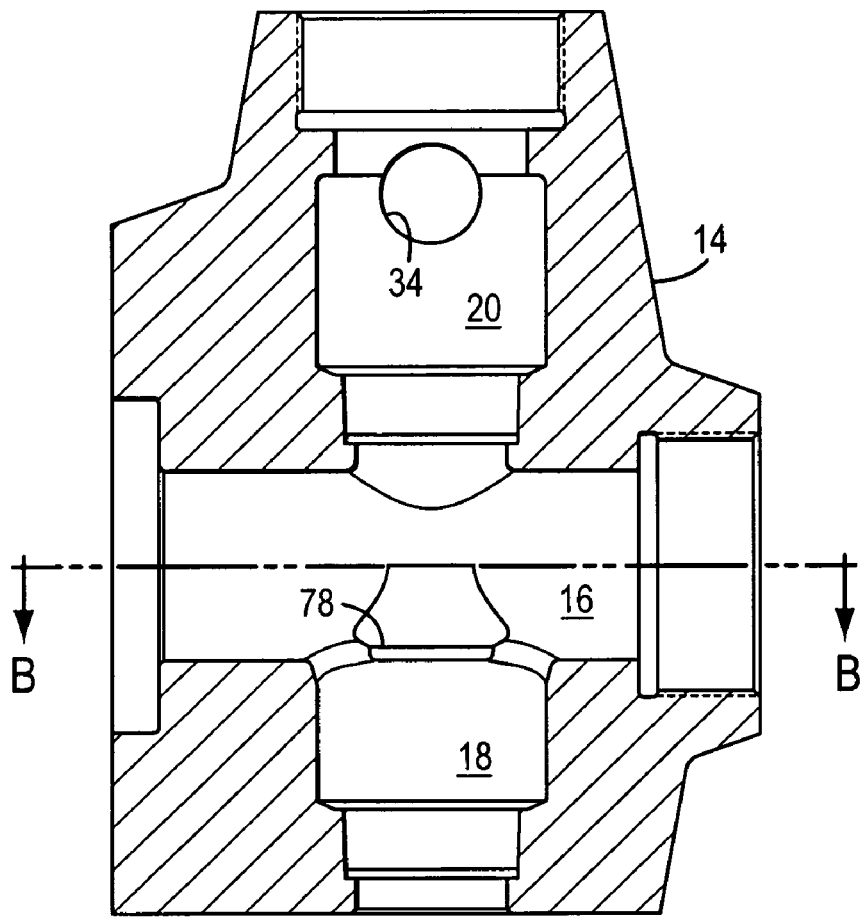
FIG. 5 is a cross sectional view of the plunger pump fluid end shown in FIG. 1, but with the parts removed to more clearly show the configuration of the plunger and suction bores.
Figure 6:
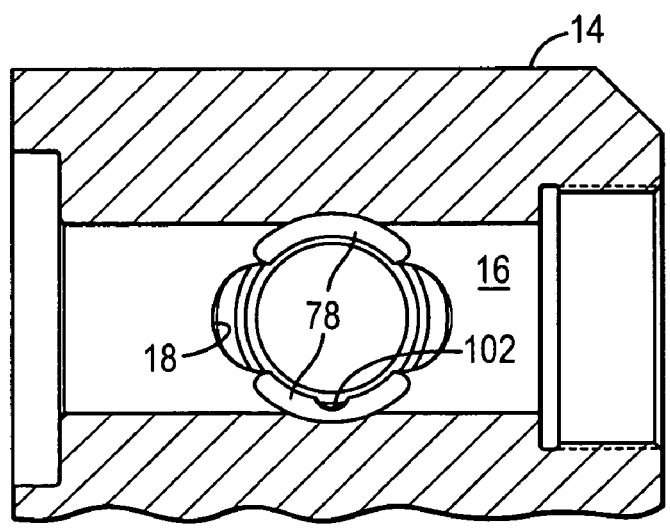
FIG. 6 is a cross sectional view of the plunger pump fluid end taken along line B-B of FIG. 5.

Referring also to FIG. 3, the valve retainer 10 includes an elongated retainer head 70 and a transverse retainer hub 72. The retainer head 70 comprises at least one and preferably two peripheral grooves 76. The grooves 76 are designed to engage corresponding radial protrusions 78 which are formed in the suction bore 18 using any suitable machining technique. As shown in FIGS. 5 and 6, each protrusion 78 extends circumferentially around the suction bore a suitable distance, such as about 28°, and is located, e.g., at the intersection of the suction bore with the plunger bore 16. If as shown in FIG. 3 the retainer head 70 comprises two peripheral grooves 76 located diametrically opposite each other, then the invention ideally also comprises two protrusions 78 located diametrically opposite each other.

Figure 4:
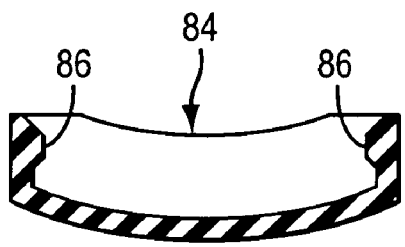
FIG. 4 is a cross sectional view of the protective boot component of the valve retainer of the present invention.

Each groove 76 defines a pair of upper and lower peripheral lips 80, 82 between which a corresponding protrusion 78 is trapped to thereby prevent the valve retainer 10, and thus the valve member 48, from being drawn into the suction bore 16. Although not necessary for purposes of the present invention, the circumferential length of at least each lower lip 82 may be greater than or equal to the circumferential length of its corresponding protrusion 78 so that the lower lip will cover and protect the protrusions against erosion caused by fluid flowing through the suction bore 18. In addition, each lower lip 82 may be provided with a cover or boot 84 which is made of, for example, a suitable elastomeric material and which serves to prevent metal-to-metal contact between the lip and the protrusion. Each boot 84 may be secured to its corresponding lower lip 82 by any suitable means. As shown in FIG. 4, such means may comprise a pair of opposing dogs 86 which snap into corresponding recesses or over corresponding detents formed on the lower lip.

In the embodiment of the invention shown in FIG. 2, the valve member 48 is movably coupled to the retainer head 70 by the retainer hub 72. The retainer hub 72 is connected to or formed integrally with the retainer head 70 and includes a cylindrical bore 74 within which the upper valve stem 54 is slidably received. In addition, reciprocal movement of the valve member 48 is aided in part by a spring 86 which is positioned over the retainer hub 72 between the retainer head 70 and the body 50 of the valve member.

To assemble the suction valve 28 within the suction bore 18, the guide disc 66 is lowered onto the shoulder 68, the seat member 60 is mounted in the reduced diameter portion 62, and the lower valve stem 56 of the valve member 48 is inserted into the guide bushing 64. At this point, the valve retainer 10 is ready to be installed. The valve spring 86 is first positioned over the retainer hub 72, and then the valve retainer 10 is lowered into the suction bore 18 with the retainer head 70 perpendicular to the protrusions 78 and the retainer hub positioned over the upper valve stem 54. The valve retainer 10 is then pressed down against the force of the spring 86 until the grooves 76 are vertically aligned with the protrusions 78. The valve retainer 10 is then rotated approximately 90° or until the upper lips 80 are oriented over the protrusions 78. In this position, the valve retainer 10 is fixed within the suction bore 18 and the valve member 48 and the spring 86 are accordingly prevented from being drawn into the plunger bore 16 during operation of the piston pump.

In operation of the piston pump 12, the plunger 22 is reciprocated by a conventional power end (not shown), which is connected to the housing 14 and coupled to the plunger by conventional means. During the suction stroke of the plunger 22, the valve member 48 is pulled off of the valve seat 58 and fluid is drawn through the inlet 30 and the suction bore 18 and into the plunger bore 16. During the discharge stroke of the plunger 22, the spring 86 will force the valve member 48 against the valve seat 58 and the fluid will be re-directed through the discharge valve 32 and the outlet 34. During both the suction stroke and the discharge stroke, the valve retainer 10 will guide the valve member 48 as it moves up and down within the suction bore 18.

If desired, the retainer hub 72 and the guide bushing 64 may each comprise a bearing sleeve 88 within which the corresponding upper and lower valve stems 54, 56 are slidably received. The bearing sleeves 88 may be secured within their corresponding bores in the retainer hub 72 and the guide bushing 64 by any suitable means, such set screws.

The valve retainer 10 may also comprise means for preventing the valve retainer 10 from rotating within the suction bore 18 after the grooves 76 are positioned over the protrusions 78. Referring again to FIG. 2, the rotation prevention means in accordance with one embodiment of the invention includes a retainer spring 90 which is mounted in a narrow, trough-shaped aperture 92 that is formed in the retainer head 70. The retainer spring 90 comprises a first end 94 which is inserted into a corresponding hole 96 in the retainer head 70 and a second end 98 which extends through an aperture 100 in the retainer head and into an adjacent groove 76. As the retainer head 70 is rotated to align the grooves 76 with the protrusions 78, the second end 98 of the retainer spring 90 will cam over one of the protrusions 78 and, when the grooves 76 are properly aligned with the protrusions 78, snap into a notch 102 which is formed in the protrusion, thereby preventing the valve retainer from rotating relative to the protrusions. If the need to remove the valve retainer 10 arises, the second end 98 of the retainer spring 90 may be lifted out of the notch 102 by a suitable tool and the retainer head 70 rotated until the grooves 76 are clear of the protrusions 78, at which point the valve retainer may be lifted out of the suction bore 18.

Figure 7:
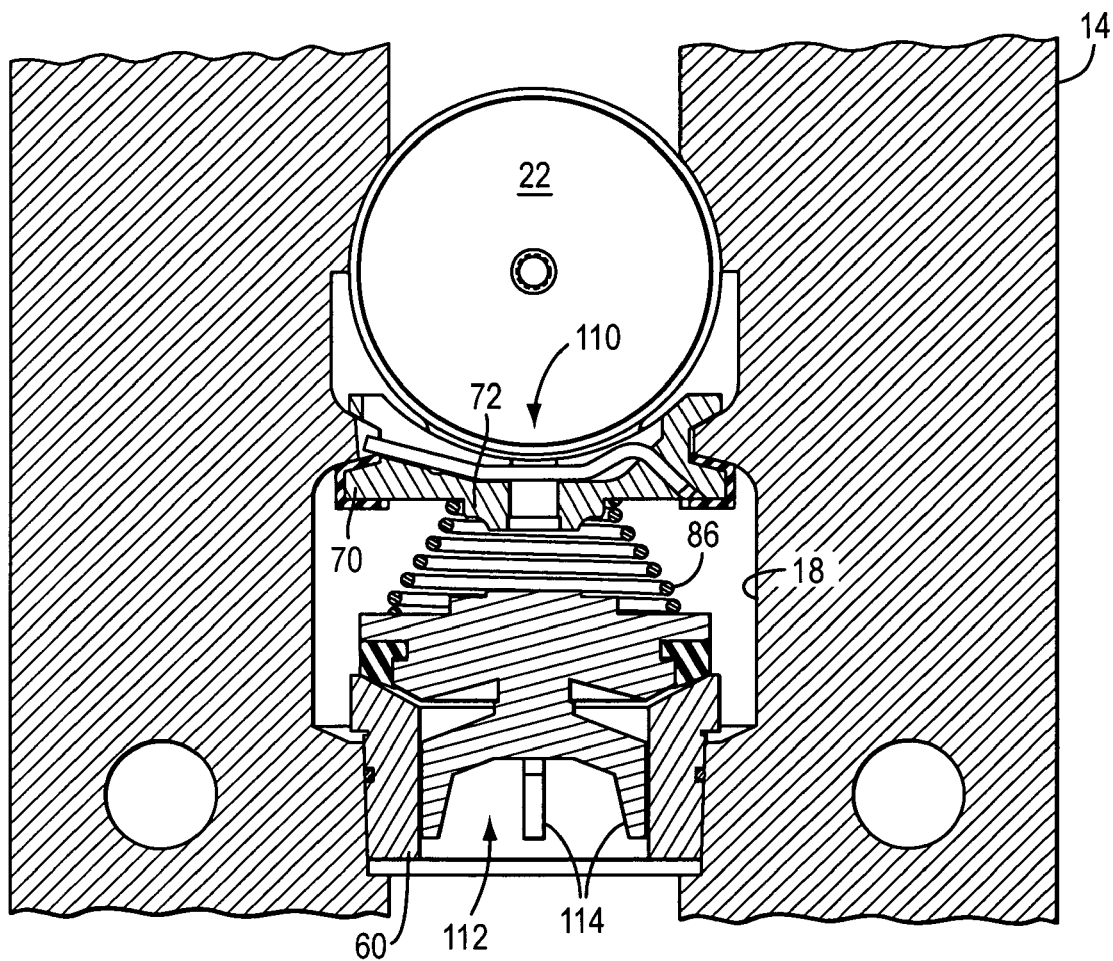
FIG. 7 is a partial cross sectional view of the fluid end of an illustrative plunger pump which incorporates another embodiment of the valve retainer of the present invention.

Another embodiment of the valve retainer of the present invention is illustrated in FIG. 7. The valve retainer of this embodiment, which is indicated generally by reference number 110, is shown installed in the suction bore 18 of the fluid end 12 of an exemplary plunger pump. As with the previous embodiment, the function of the valve retainer 110 is to retain and guide a valve member, generally 112, within the suction bore 18 during operation of the pump. Unlike in the previous embodiment, however, the valve member 112 does not include an upper valve stem. Rather, the valve member 112 comprises a number of depending legs 114 which are slidably received within the seat member 60 in order to guide the valve member along the axis of the suction bore 18.

In the embodiment of the invention shown in FIG. 7, therefore, the valve member 112 is movably coupled to the valve retainer 110 solely by the spring 86. Although the valve retainer comprises a somewhat truncated retainer hub 72, this is provided mainly as a radial guide for the upper portion of the spring 86.

It should be recognized that, while the present invention has been described in relation to the preferred embodiments thereof, those skilled in the art may develop a wide variation of structural and operational details without departing from the principles of the invention. Therefore, the appended claims are to be construed to cover all equivalents falling within the true scope and spirit of the invention.

What is claimed is:

1. In combination with a pump which comprises a fluid bore and a valve member which is positioned in the fluid bore, the fluid bore comprising a central axis and a pair of generally diametrically opposed, radially inwardly extending protrusions which are spaced apart a distance, the improvement comprising a retainer for the valve member which includes:
   a retainer head which comprises a pair of diametrically opposed grooves within which the protrusions are received to thereby secure the retainer head within the fluid bore;
   a retainer hub which is connected to or formed integrally with the retainer head and which is movably coupled to the valve member;
   each groove defining a corresponding pair of upper and lower lips, the upper lips being disposed in a first plane which is generally perpendicular to the central axis and the lower lips being disposed in a second plane which is generally perpendicular to the central axis;
   wherein the width of the retainer head in each of the first and second planes in a direction generally perpendicular to a line joining the grooves is less than the distance between the protrusions.

2. The combination of claim 1, wherein the retainer hub slidably engages the valve member.

3. The combination of claim 2, wherein the retainer hub comprises a cylindrical bore within which a stem portion of the valve member is slidably received.

4. The combination of claim 1, wherein the valve member is movably coupled to the retainer hub by a spring.

5. The combination of claim 1, further comprising a cover which is positioned over each lower lip.

6. The combination of claim 5, wherein the cover is comprised of an elastomeric material.

7. The combination of claim 1, further comprising means for preventing the retainer from rotating relative to the fluid bore when the groove is positioned over the protrusion.

8. The combination of claim 6, wherein the rotation prevention means comprises an elongated retainer spring which is positioned in an aperture that extends diametrically through the retainer head between the grooves, the retainer spring including a first end which is secured to the retainer head proximate one of the grooves and a second end which extends into the other of the grooves, wherein when the retainer is rotated to position the lips over their corresponding protrusions, the second end will enter a notch which is formed in one of the protrusions and thereby prevent the retainer from rotating relative to the fluid bore.

* * * * *